Dec. 11, 1956     A. G. PAPE     2,773,276
LOUVER WINDOW-WASHER
Filed June 9, 1954
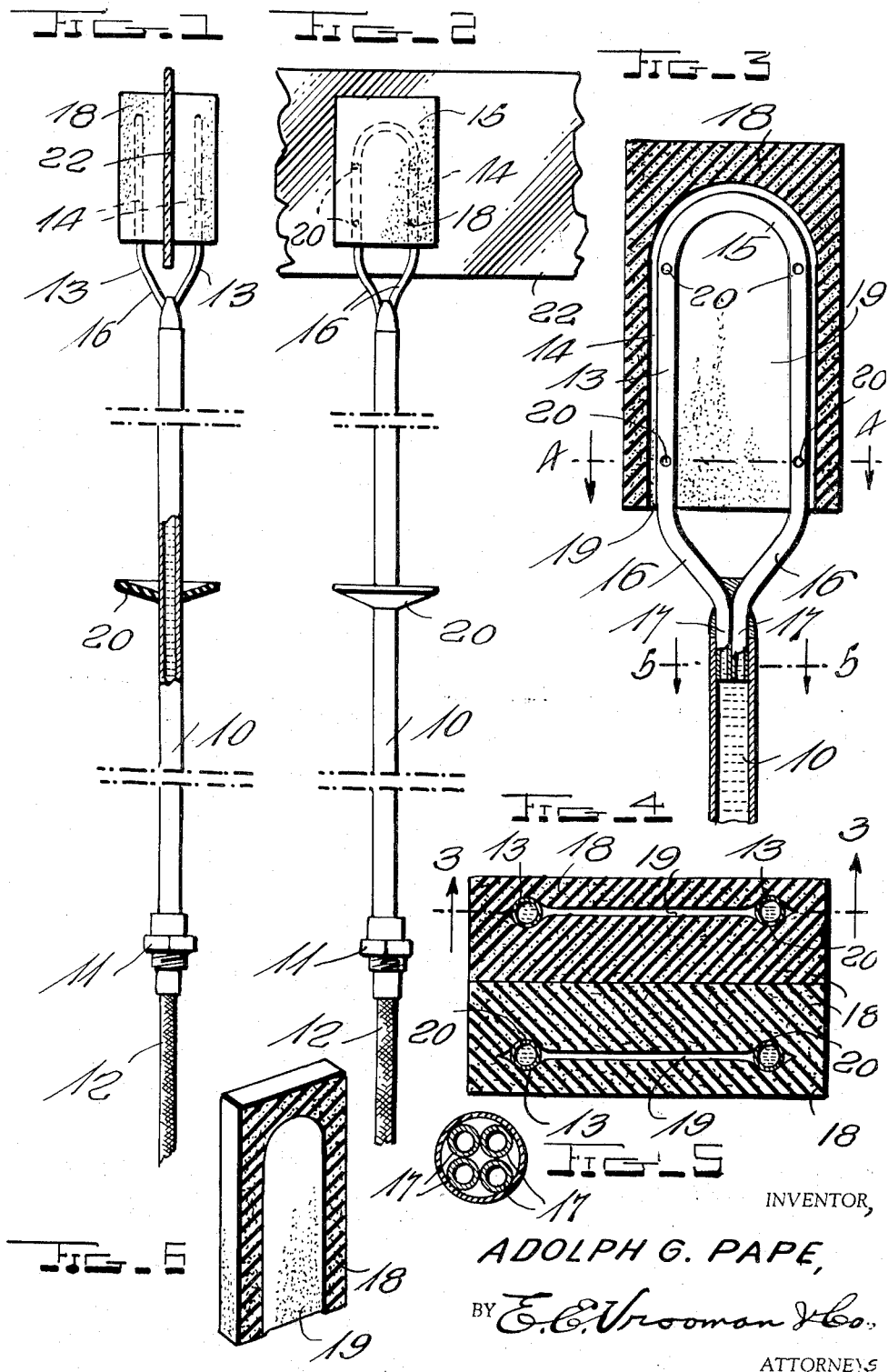
INVENTOR,
ADOLPH G. PAPE,
BY E. E. Vrooman & Co.,
ATTORNEYS

United States Patent Office 2,773,276
Patented Dec. 11, 1956

2,773,276
LOUVER WINDOW-WASHER

Adolph G. Pape, Topeka, Kans.

Application June 9, 1954, Serial No. 435,499

1 Claim. (Cl. 15—130)

This invention relates to a louver window washer, particularly adapted to cleaning the blades of what is generally termed a Venetian blind.

One important object of this invention is to provide a novel device of this character which will enable each leaf of a Venetian blind to be thoroughly cleansed.

A second important object of this invention is to provide a device of this character whereby the cleaning member thereof may be constantly supplied with water or other cleaning fluid.

A third important object of the invention is to provide a device of this character having contact members for the louver which may be readily removed and replaced when soiled or worn.

With the above and other objects in view, the invention consists in general of certain novel details of construction and combinations of parts hereinafter fully described, illustrated in the accompanying drawings, and particularly claimed.

In the accompanying drawings, like characters of reference indicate like parts, and:

Fig. 1 is a view partly in elevation and partly in section showing the device applied to a louver blade.

Fig. 2 is a view similar to Fig. 1 but at right angles thereto.

Fig. 3 is an enlarged detailed view on the line 3—3 of Fig. 4.

Fig. 4 is a similar and further enlarged detailed view on the line 4—4 of Fig. 3.

Fig. 5 is a section on the line 5—5 of Fig. 3 and

Fig. 6 is a perspective view on the line 3—3 of Fig. 4 showing the washing member.

As here shown this invention consists in a tubular handle 10 having at one end a pipe connection 11 whereby a water supply pipe 12 may be connected to the handle. At the opposite end of the handle there is provided a pair of tubular extensions 13, each of which has a loop portion 14 provided with a semi-circular end 15. These loop portions have parallel sides and from the parallel sides converging portions 16 extend downwardly and terminate in contacting parallel portions 17 engaging in the handle 10. These tubular portions 13 receive water from the handle 10 when the latter is connected to the supply 12. As shown in Fig. 1, the portions 13 are arranged in spaced parallel relation.

In connection with these tubular arrangements there is provided a pair of scrubbing elements, each of which consists of a block of rectangular form 18 which is composed of any suitable water absorbent material such as sponge rubber, and which is provided with a slit 19 extending from one end to the other so that the loop members 13 may be forced into the slit. Furthermore, these loop members are perforated as at 20 so that water in the loop members may escape therefrom and maintain the blocks 18 in moistened condition.

In the use of the device, it is preferred to connect the handle 10 to a suitable supply of water and to adjust the guard 20 provided thereon in proper position for easy handling of the device. Then the blocks 18 are forced over the edge of the louver slat 22 in the manner shown in Figs. 1 and 2 and are moved to and fro in contact with the blade and thus thoroughly cleanse the same.

It is obvious that minor changes may be made in the form and construction of this invention without departing from the material principles thereof. It is not therefore desired to confine the invention to the exact form herein shown and described, but it is wished to include all such as properly come within the scope claimed.

I claim:

A louver window-washer including an elongated fluid-supplying tubular handle, a hose connection at one end of said tubular handle, a pair of oppositely disposed tubular extension loops carried by the other end of said handle, each loop being in connection with said tubular handle, said loops being in parallel conformity and in spaced relation and having scrubbing elements thereon, each scrubbing element comprising a sponge member having an interiorly-extended pocket open at one end only, said tubular extension loops being seated in said pockets, said sponge members being of rectangular configuration and having opposed contacting flat surfaces to provide maximum opposed confronting cleaning surfaces adapted simultaneously to clean opposite surfaces of a louver, and fluid exit openings in each tubular extension loop contacting a surface of said sponge member to provide a maximum fluid distribution therethrough.

References Cited in the file of this patent

UNITED STATES PATENTS

| Number | Name | Date |
|---|---|---|
| 358,875 | Nichols | Mar. 8, 1887 |
| 1,394,282 | Crosby | Oct. 18, 1921 |
| 1,410,620 | Strieff | Mar. 28, 1922 |
| 1,598,742 | Parker | Sept. 7, 1926 |
| 2,250,909 | Habeck | July 29, 1941 |
| 2,288,353 | Hiatt | June 30, 1942 |